United States Patent
Yokoyama et al.

(10) Patent No.: US 7,402,336 B2
(45) Date of Patent: *Jul. 22, 2008

(54) PRESSURE-SENSITIVE ADHESIVE TAPE

(75) Inventors: Junji Yokoyama, Ibaraki (JP);
Yoshikazu Soeda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/041,394

(22) Filed: Jan. 25, 2005

(65) Prior Publication Data

US 2005/0163995 A1   Jul. 28, 2005

(30) Foreign Application Priority Data

Jan. 27, 2004   (JP) ............... P2004-018094

(51) Int. Cl.
*B32B 7/12* (2006.01)
(52) U.S. Cl. ................. 428/354; 428/343
(58) Field of Classification Search ............ 428/354, 428/345
See application file for complete search history.

(56) References Cited

U.S. PATENT DOCUMENTS 5,468,532 A * 11/1995 Ho et al. ............ 428/40.9

| | | |
|---|---|---|
| 2003/0089516 A1 | 5/2003 | Hattori et al. |
| 2004/0028895 A1* | 2/2004 | Yamakami et al. ....... 428/354 |
| 2004/0121148 A1 | 6/2004 | Miyano et al. |

FOREIGN PATENT DOCUMENTS

| | | |
|---|---|---|
| EP | 1 386 950 A1 | 2/2004 |
| JP | 2002-23663 A | 2/2002 |
| JP | 2002-235053 A | 8/2002 |
| JP | 2002-249741 A | 9/2002 |
| JP | 2004-156015 A | 6/2004 |
| JP | 2004-161955 A | 6/2004 |
| JP | 2004-184443 A | 7/2004 |
| WO | WO 02/066570 A1 | 8/2002 |
| WO | WO 2004/028797 A1 | 4/2004 |
| WO | WO 2005/019367 A1 | 3/2005 |

OTHER PUBLICATIONS

Mulch Film for Agriculture, English translation of JP 2003-38046, Publication date Feb. 12, 2003.*
Derwent Abstract of JP 07278503A, Publication date Oct. 24, 1995.*
European Search Report dated Apr. 20, 2005.

* cited by examiner

*Primary Examiner*—Terrel Morris
*Assistant Examiner*—Anish Desai
(74) *Attorney, Agent, or Firm*—Sughrue Mion, PLLC

(57) ABSTRACT

A pressure-sensitive adhesive tape contains a substrate and a pressure-sensitive adhesive layer disposed on at least one side of the substrate, wherein the substrate contains colored layers containing a silver layer, a layer of a color other than silver and black, and a black layer which are superposed in this order.

8 Claims, 3 Drawing Sheets

PRESSURE-SENSITIVE ADHESIVE TAPE

FIELD OF THE INVENTION

The present invention relates to a pressure-sensitive adhesive tape. The pressure-sensitive adhesive tape of the invention functions to reflect light and shut off light rays having specific wavelengths. It is useful as a pressure-sensitive adhesive tape for fixing a liquid-crystal display module unit to a backlight unit in fabricating, for example, a liquid-crystal display (LCD) of the internal/external dual lighting type which is suitable for use in applications such as cell phones and PDAs.

BACKGROUND OF THE INVENTION

LCDs of the internal/external dual lighting type which are employed in cell phones and the like include a liquid-crystal display module unit and a backlight unit which are fixed to each other with a pressure-sensitive adhesive tape as shown in FIG. 7 (see JP-A-2002-249741, JP-A-2002-23663, and JP-A-2002-235053). (The term "JP-A" as used herein means an "unexamined published Japanese patent application".) This pressure-sensitive adhesive tape is required to have the property of reflecting light and the property of shutting off light having specific wavelengths. Light-reflecting properties are necessary for reflecting the light from the backlight to thereby enhance luminance and reduce the power consumption based on the effective utilization of reflected light. On the other hand, light-shutting properties are necessary for inhibiting the light from the backlight from leaking out to the LCD surface to cause viewing failures.

Pressure-sensitive adhesive tapes which reconcile light-reflecting properties and light-shutting properties have hitherto been investigated. Pressure-sensitive adhesive tapes of this kind generally have a colored layer disposed on one side of the substrate film or have a colored pressure-sensitive adhesive layer. In general, a white layer is disposed on the backlight side in order to reflect the light from the backlight, and a black layer is disposed on the liquid-crystal display module side in order to prevent the light from leaking out to the LCD surface. For example, a pressure-sensitive adhesive tape employing a substrate film colored white has a transparent pressure-sensitive adhesive layer disposed on the backlight side and has a black layer or black-pressure-sensitive adhesive layer disposed on the liquid-crystal display module side. A pressure-sensitive adhesive tape employing a substrate film colored black has a white layer or white pressure-sensitive adhesive layer disposed on the backlight side and has a transparent pressure-sensitive adhesive layer on the liquid-crystal display module side. Furthermore, a pressure-sensitive adhesive tape employing a transparent substrate film has a white layer or white pressure-sensitive adhesive layer disposed on the backlight side and has a black layer or black pressure-sensitive adhesive layer disposed on the liquid-crystal display module side.

However, in order to reconcile light-reflecting properties and light-shutting properties with such a pressure-sensitive adhesive tape, it is necessary to superpose many colored layers or to form colored layers thickly. This has resulted in a problem that the pressure-sensitive adhesive tape comes to have an increased total thickness and be unable to conform to thickness and weight reduction in cell phones and the like.

SUMMARY OF THE INVENTION

An object of the invention is to provide a pressure-sensitive adhesive tape which is usable for fixing a liquid-crystal display module unit to a backlight unit in fabricating an LCD, and which can function to reflect light and shut off light even when it has a thickness capable of conforming to thickness and weight reduction.

Another object of the invention is to provide a liquid-crystal display which includes a liquid-crystal display module unit and a backlight unit fixed thereto with the pressure-sensitive adhesive tape. Still another object of the invention is to provide a pressure-sensitive adhesive tape substrate for use in the pressure-sensitive adhesive tape.

The present inventors made intensive investigations in order to overcome the problem. As a result, they have found that those objects can be accomplished with the pressure-sensitive adhesive tape described below. The invention has thus been achieved.

Specifically, the invention relates to a pressure-sensitive adhesive tape which comprises a substrate and a pressure-sensitive adhesive layer disposed on at least one side of the substrate, wherein the substrate comprises colored layers comprising a silver layer, a layer of a color other than silver and black, and a black layer which are superposed in this order.

In the pressure-sensitive adhesive tape of the invention, a layer of a color other than silver and black has been disposed between a silver layer and a black layer. Due to this layer arrangement, the absorption by the black layer of the light which has passed through the silver layer can be lessened and, hence, the reflectance on the silver layer is improved. As a result, when this pressure-sensitive adhesive tape is used for fixing a liquid-crystal display module unit to a backlight unit in fabricating an LCD of the internal/external dual lighting type, then a heightened luminance can be attained. In addition, since there is no need of superposing many colored layers or forming colored layers thickly, the pressure-sensitive adhesive tape can have a reduced total thickness and conform to thickness and weight reduction. On the other hand, since the black layer has light-shutting properties, the light from the backlight can be inhibited from leaking out to the LCD surface to cause viewing failures.

In a preferred embodiment of the pressure-sensitive adhesive tape, the substrate comprises a supporting substrate and colored layers, wherein the colored layers are a silver layer, a layer of a color other than silver and black, and a black layer which are superposed in this order from the supporting substrate side. In this pressure-sensitive adhesive tape, the supporting substrate preferably is a transparent substrate film.

In another preferred embodiment of the pressure-sensitive adhesive tape, the substrate comprises a supporting substrate and colored layers, wherein the supporting substrate is a black substrate film, and the colored layers are a layer of a color other than silver and black and a silver layer which are superposed in this order from the black substrate film side.

In a further preferred embodiment of the pressure-sensitive adhesive tape, the substrate comprises a supporting substrate and colored layers, wherein the supporting substrate is a substrate film of a color other than silver and black and has a silver colored layer on one side of the substrate film of a color other than silver and black and a black colored layer on one side in the opposite side thereto.

In the pressure-sensitive adhesive tape, it is preferable from the standpoints of light-shutting properties and light-reflecting properties that the silver colored layer is made of a metallic vapor deposition layer. The metallic vapor deposition layer is preferably a vapor deposition layer of silver and/or aluminum.

In the pressure-sensitive adhesive tape, the layer of a color other than silver and black preferably is a white layer. Although the color other than silver and black is not particularly limited, white is preferred because the pressure-sensitive adhesive tape containing a white layer can exhibit light-shutting properties and light-reflecting properties in steps.

The pressure-sensitive adhesive tape is suitable for use in fixing a liquid-crystal display module unit to a backlight unit. This pressure-sensitive adhesive tape for fixing is used in such a manner that the black layer is disposed on the liquid-crystal display module unit side and the silver layer is disposed on the backlight unit side.

The invention further relates to a liquid-crystal display including a liquid-crystal display module unit and a backlight unit, wherein the display module unit and the backlight unit being fixed to each other with the pressure-sensitive adhesive tape described above.

The invention furthermore relates to a pressure-sensitive adhesive tape substrate which comprises colored layers comprising a silver layer, a layer of a color other than silver and black, and a black layer which are superposed in this order, the substrate being for use in the pressure-sensitive adhesive tape described above.

DESCRIPTION OF REFERENCE NUMERALS AND SIGNS

1: Substrate
11: Colored layers
12: Supporting substrate
S: Silver layer
W: Layer of color other than silver and black
B: Black layer
2: Pressure-sensitive adhesive layer

DETAILED DESCRIPTION OF THE INVENTION

Figure 1:
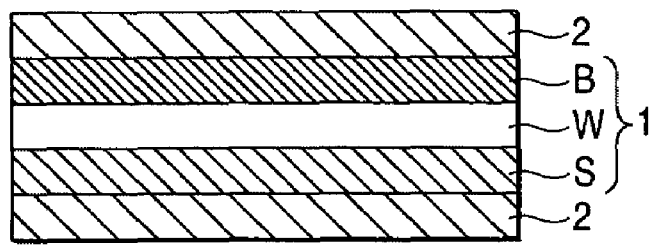
FIG. 1 is a sectional view of one embodiment of the pressure-sensitive adhesive tape according to the invention.

The pressure-sensitive adhesive tape of the invention will be explained below by reference to drawings. The pressure-sensitive adhesive tape of the invention comprises a substrate 1 and a pressure-sensitive adhesive layer 2 disposed on at least one side of the substrate 1. The pressure-sensitive adhesive tape shown in FIG. 1 comprises a substrate 1 and a pressure-sensitive adhesive layer 2 disposed on each side of the substrate 1. The substrate 1 comprises a silver layer (hereinafter referred to also as "S layer"), a layer of a color other than silver and black (hereinafter referred to also as "W layer"), and a black layer (hereinafter referred to also as "B layer") which are superposed in this order. The pressure-sensitive adhesive tape of the invention can be used in a sheet form.

The colored layers in the invention can be expressed in terms of chromaticity, which can be expressed by the value of L in L·a·b values determined with a calorimeter. The silver layer (S layer) is a layer having a chromaticity L, as measured with a colorimeter, in the range of 80±10, and preferably in the range of 80±5, while the black layer (B layer) is a layer having a chromaticity L, as measured with a calorimeter, in the range of 25±10. The W layer is not particularly limited as long as it is colored other than silver and black. For example, the W layer can be colored white, blue, or red. Of these, the W layer is preferably colored white from the standpoint of the light-reflecting properties. In the case where the W layer is white, the W layer is a layer having a chromaticity L, as measured with a colorimeter, in the range of 92±5.

The pressure-sensitive adhesive tape of the invention is not particularly limited as long as the substrate 1 comprises the S layer, W layer, and B layer in this order. Examples thereof include pressure-sensitive adhesive tapes in which the substrate 1 comprises a supporting substrate 12 and colored layers 11 as shown in FIGS. 2 to 6.

Figure 2:
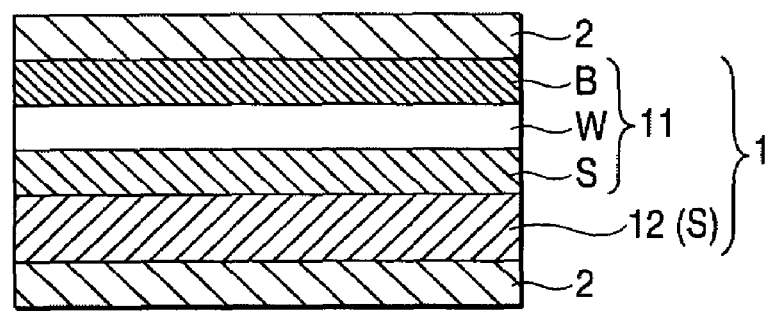
FIG. 2 is a sectional view of another embodiment of the pressure-sensitive adhesive tape according to the invention.
Figure 4:
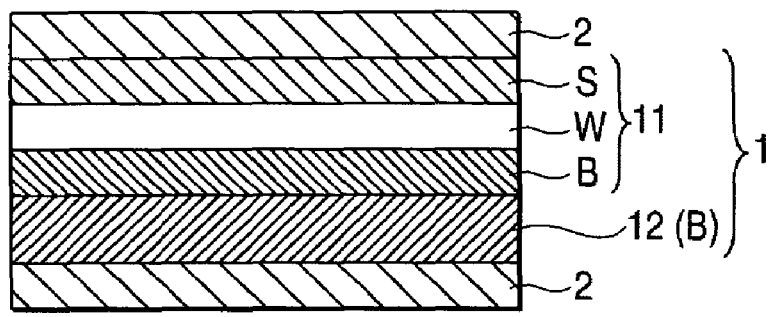
FIG. 4 is a sectional view of a further embodiment of the pressure-sensitive adhesive tape according to the invention.

The pressure-sensitive adhesive tape shown in FIG. 2 includes a 11S layer, a 11W layer, and a 11B layer which have been formed in this order as colored layers 11 from the supporting substrate 12 side. The pressure-sensitive adhesive tape shown in FIG. 4 includes a 11B layer, a 11W layer, and a 11S layer which have been formed in this order as colored layers 11 from the supporting substrate 12 side. In FIGS. 2 and 4, the supporting substrate 12 may be a transparent substrate film. Namely, the substrate 1 may include a transparent layer as long as it comprises a W layer, S layer, and B layer in this order.

In the pressure-sensitive adhesive tape shown in FIG. 4, the supporting substrate 12 can be a black substrate film 12B so that this supporting substrate 12 itself serves as a B layer. In the pressure-sensitive adhesive tape shown in FIG. 2, the supporting substrate 12 can be a silver substrate film 12S so that this supporting substrate 12 itself serves as an S layer. Namely, as long as the substrate 1 comprises an S layer, a W layer, and a B layer in this order, the S layer, W layer, and B layer each-may consist of a single layer or may-be composed of two or more layers.

Figure 3:
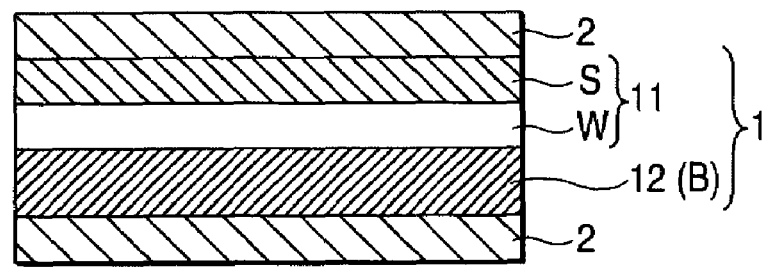
FIG. 3 is a sectional view of still another embodiment of the pressure-sensitive adhesive tape according to the invention.
Figure 5:
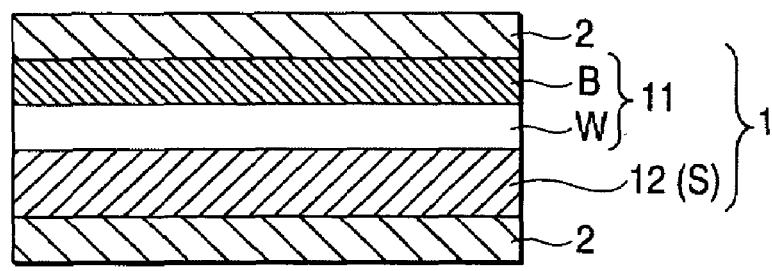
FIG. 5 is a sectional view of still a further embodiment of the pressure-sensitive adhesive tape according to the invention.

The pressure-sensitive adhesive tape shown in FIG. 3 includes a 11W layer and a 11S layer which have been formed in this order as colored layers 11 from the supporting substrate 12 side. In FIG. 3, the supporting substrate 12 is a black substrate film 12B so that the supporting substrate 12 itself serves as a B layer. The pressure-sensitive adhesive tape shown in FIG. 5 includes a 11W layer and a 11B layer which have been formed in this order as colored layers 11 from the supporting substrate 12 side. In FIG. 5, the supporting substrate 12 is a silver substrate film 12S so that the supporting substrate 12 itself serves as an S layer.

In the pressure-sensitive adhesive tape of the invention, the B layer contributes to light-shutting properties, while the S layer contributes to light-reflecting properties. In general, obtaining light-reflecting properties with an S layer is more difficult than obtaining light-shutting properties with a B layer. Because of this, a preferred embodiment of the pressure-sensitive adhesive tape of the invention is the pressure-sensitive adhesive tape shown in FIG. 3 or 5 in which the supporting substrate 12 is a silver substrate film 12S.

Figure 6:
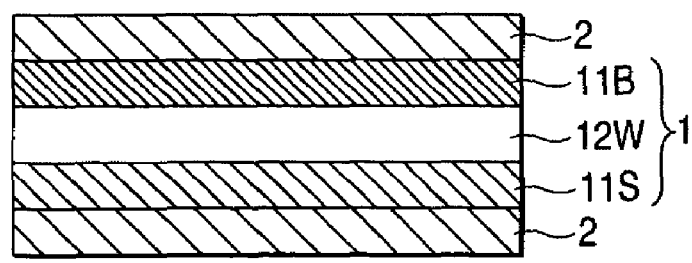
FIG. 6 is a sectional view of even a further embodiment of the pressure-sensitive adhesive tape according to the invention.
Figure 7:
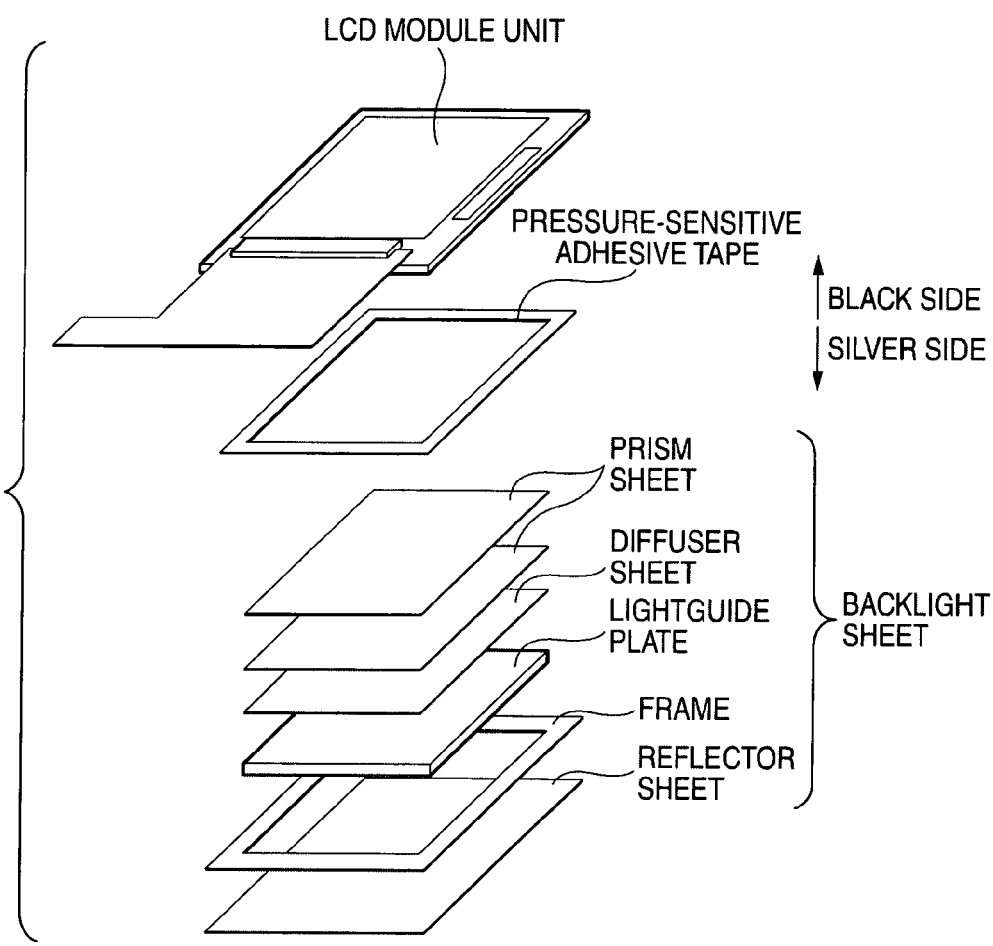
FIG. 7 is a diagrammatic view illustrating the use of a pressure-sensitive adhesive tape for fixing a liquid-crystal display module unit to a backlight unit.

Examples of other embodiments of the pressure-sensitive adhesive tape of the invention include a pressure-sensitive adhesive tape which includes: a supporting substrate 12 which is a white substrate film 12W so that the supporting substrate 12 itself serves as a W layer; and a 11B layer and a 11S layer which are disposed as colored layers on one side and the other side, respectively, of the supporting substrate 12, as shown in FIG. 6. Examples thereof further include a pressure-sensitive adhesive tape including a supporting substrate 12 which itself is composed of an S layer, a W layer, and a B layer which are superposed in this order.

The material of the supporting substrate 12 is not particularly limited, and various kinds of materials can be used. Examples thereof include polyesters such as poly(ethylene terephthalate), poly(butylene terephthalate), and poly(ethylene naphthalate); polyolefins such as poly-ethylene and polypropylene; poly(vinyl alcohol); and poly-(vinylidene chloride). Preferred of these from the standpoints of transparency, strength, etc. are polyesters such as poly(ethylene terephthalate).

The thickness of the supporting substrate 12 is not particularly limited. However, from the standpoints of thickness and weight reduction and processability, the thickness thereof is generally about from 4 to 70 μm, preferably from 10 to 50 μm. In the case where a white substrate film, black substrate film, or the like is to be used as the supporting substrate 12, a pigment or the like is incorporated according to the color.

The colored layers 11 each can be formed by applying a composition comprising a pigment, a binder, and a solvent to the supporting substrate 12. As the binder can be used any of binders for use in colored-layer formation without particular limitations. Examples thereof include polyurethanes, phenolic resins, epoxy resins, urea-melamine resins, and poly (methyl methacrylate). The solvent is suitably selected according to the kinds of the pigment and binder. The pigment is suitably selected according to the color of each of the S layer, W layer, and B layer. Such colored-layer formation by printing is effective in the case of forming the 11W layer or 11B layer.

The total thickness of the colored layers 11 is generally preferably about from 1 to 10 μm. The thickness of each colored layer by printing is generally preferably about from 1 to 2 μm. For forming the colored layers by printing, techniques heretofore in use for colored-layer formation, such as, e.g., gravure printing, flexography, or offset printing, can be employed without particular limitations.

Pigments to be used for coloring in forming the supporting substrate 12 and colored layers 11 are a black pigment for the B layer. Examples of the black pigment include carbon black, acetylene black, vegetable black, and graphite. A pigment is used for the W layer according to the color other than silver and black. In the case where the W layer is white, a white pigment is used. Examples of the white pigment include titanium dioxide, zinc white, and white lead. A silver pigment is used for the S layer. Examples of the silver pigment include aluminum.

For forming the colored layers, the formation of the 11S layer can be carried out by metallic vapor deposition. Since the S layer contributes to light-reflecting properties and light-shutting properties, the S layer is preferably prepared by metallic vapor deposition. The 11S layer prepared by metallic vapor deposition is advantageous as compared with one prepared by printing because both light-reflecting properties and light-shutting properties can be improved due to good surface smoothness and layer denseness. Further, there is an advantage that the thickness of the film prepared by metallic vapor deposition can be made thin.

As the metallic vapor deposition, vacuum vapor deposition, physical sputtering, chemical sputtering, and the like can be employed. Of these, vacuum vapor deposition is generally employed. For forming the metallic vapor deposition layer, metallic materials having a high reflectance are suitably used. Examples of metallic materials include silver, aluminum, gold, rhodium, copper, and titanium. Of these, silver and aluminum are preferable. The metallic vapor deposition layer as the 11S layer has a thickness of from 300 to 2,000 angstrom, preferably from 400 to 1,000 angstrom, and more preferably from 400 to 500 angstrom.

As the pressure-sensitive adhesive constituting each pressure-sensitive adhesive layer 2 can be used, without particular limitations, any of various pressure-sensitive adhesives including acrylic pressure-sensitive adhesives, rubber-based pressure-sensitive adhesives, and silicone pressure-sensitive adhesives.

Especially preferred examples of the acrylic pressure-sensitive adhesives are ones comprising as the base polymer either a homopolymer of an alkyl (meth)acrylate in which the alkyl group has 1 to 18 carbon atoms or a copolymer of the alkyl(meth)acrylate with one or more other copolymerizable monomers, e.g., functional monomers.

Examples of the alkyl (meth)acrylate include methyl acrylate, ethyl acrylate, butyl acrylate, isobutyl acrylate, hexyl acrylate, octyl acrylate, 2-ethylhexyl acrylate, isooctyl acrylate, decyl acrylate, isodecyl acrylate, lauryl acrylate, stearyl acrylate, and the alkyl methacrylates corresponding to these acrylates.

Examples of the functional monomers include monomers having one or more hydroxyl groups, monomers having one or more carboxyl groups, and monomers having one or more amide groups. Examples of the monomers having one or more hydroxyl groups include hydroxyalkyl(meth)acrylates such as 2-hydroxyethyl(meth)acrylate and hydroxypropyl (meth)acrylate. Examples of the monomers having one or more carboxyl groups include α,β-unsaturated carboxylic acids such as acrylic acid, methacrylic acid, and crotonic acid; monoalkyl maleates such as butyl maleate; unsaturated dibasic acids such as maleic acid, fumaric acid, and itaconic acid; and dibasic acid anhydrides such as maleic anhydride. Examples of the monomers having one or more amide groups include acrylamide, alkyl(meth)acrylamides such as dimethyl(meth)acrylamide and diethyl(meth)acrylamide, N-alkoxymethyl(meth)acrylamides such as N-butoxymethyl (meth)acrylamide and N-ethoxymethyl-(meth)acrylamide, and diacetone(meth)acrylamide. Examples of monomers having one or more amino groups include dimethylaminoethyl(meth)acrylate. Other usable copolymerizable monomers include vinyl acetate, styrene, α-methylstyrene, vinyl chloride, acrylonitrile, ethylene, propylene, and the like.

In producing a copolymer of an alkyl(meth)acrylate, it is preferred to copolymerize monomers so that the content of alkyl (meth)acrylate units in the resultant copolymer is 50% by weight or higher based on all monomer units. When the proportion of alkyl(meth)acrylate units is lower than 50% by weight, there is the possibility that the pressure-sensitive adhesive might show insufficient pressure-sensitive adhesive properties. The proportion of alkyl (meth)acrylate units more preferably is 60% by weight or higher.

Besides the base polymer, other ingredients such as, e.g., a tackifier and a crosslinking agent are incorporated into the pressure-sensitive adhesive, e.g., acrylic pressure-sensitive adhesive, according to need. Examples of the tackifier include rosin resins, polyterpene resins, coumarone-indene resins, petroleum resins, and terpene-phenol resins. Examples of the crosslinking agent include isocyanate crosslinking agents, epoxy crosslinking agents, oxazoline crosslinking agents, aziridine crosslinking agents, and metal chelate crosslinking agents.

Examples of the rubber-base pressure-sensitive adhesives include ones comprising as the base polymer a rubbery elastomer such as natural rubber, a styrene/isoprene block copolymer, a styrene/butadiene block copolymer, polyisoprene, polybutene, polyisobutylene, or an ethylene/vinyl acetate copolymer. A tackifier such as, e.g., a rosin resin, polyterpene resin, coumarone-indene resin, petroleum resin, or terpene-phenol resin is incorporated in an appropriate amount into the rubbery elastomer. According to need, a softener such as, e.g., liquid polybutene, mineral oil, liquid polyisoprene, or liquid polyacrylate is further incorporated. As a silicone pressure-sensitive adhesive may be used one comprising polydimethylsiloxane or the like as the main component.

Various additives including an antioxidant, e.g., butylhydroxytoluene, can be added in appropriate amounts to the pressure-sensitive adhesive.

The pressure-sensitive adhesive layer 2 may be formed on one or each side of a substrate 1. Techniques for forming the pressure-sensitive adhesive layer 2 are not particularly limited. Examples of usable techniques include: a method in which a solution or emulsion containing a pressure-sensitive adhesive is directly applied to a substrate 1 with a comma coater, top-feed reverse coater, or the like and dried; and a method in which a pressure-sensitive adhesive layer 2 is separately formed on a release film and this release film having the adhesive layer 2 formed thereon is then applied to a substrate 1.

The thickness of each pressure-sensitive adhesive layer 2 can be determined according to the intended use, etc. In general, it is from 10 to 200 µm. In the case where the pressure-sensitive adhesive tape is to be used as a pressure-sensitive adhesive tape for fixing a liquid-crystal display module unit to a backlight unit in fabricating a liquid-crystal display to be used in a cell phone or the like, the thickness of each pressure-sensitive adhesive layer is preferably from 10 to 50 µm from the standpoint of thickness and weight reduction.

Although each pressure-sensitive adhesive layer 2 usually is transparent, it can be colored silver or black. Namely, the pressure-sensitive adhesive layer 2 located on the S layer side of the substrate 1 can be colored silver, and the pressure-sensitive adhesive layer 2 located on the B layer side of the substrate 1 can be colored black.

A separator is applied to each pressure-sensitive adhesive layer 2 according to need. Examples of the material constituting the separator include paper and films of synthetic resins such as polyethylene, polypropylene, and poly(ethylene terephthalate). The surface of the separator may have undergone a release treatment such as, e.g., a treatment with a silicone, long-chain alkyl type release agent, or fluorochemical according to need so as to have enhanced releasability from the pressure-sensitive adhesive layer. The thickness of the separator is generally about from 10 to 200 µm, preferably about from 25 to 100 µm.

The invention will be explained below in greater detail by reference to Examples, but the invention should not be construed as being limited by these Examples in any way. Chromaticity measurements were made with colorimeter CR-200, manufactured by Minolta Co., Ltd.

EXAMPLE 1

A film in which a vapor deposition layer of silver (chromaticity L: 80) was printed as a colored layer on one side of a 38 µm-thick white substrate film (poly(ethylene terephthalate); chromaticity L: 92) and a black layer (chromaticity L: 25) was printed as a colored layer in the opposite side thereto was used as a substrate. The ink used for printing the black layer was NB-500, manufactured by Dainichiseika Color & Chemicals Mfg. Co., Ltd. The colored layers were set up so as to have a thickness of 500 angstrom for the vapor deposition layer of silver and 1 µm for the black layer, respectively. A transparent acrylic pressure-sensitive adhesive was applied to each side of the substrate and dried to form a pressure-sensitive adhesive layer having a thickness of 20 µm. Thus, a double-faced pressure-sensitive adhesive tape was obtained.

EXAMPLE 2

A film in which a vapor deposition layer of aluminum (chromaticity L: 77) and two layers of a white layer (chromaticity L: 92) and a black layer (chromaticity L: 25) were successively printed as colored layers on one side of a 13 µm-thick transparent substrate film (poly(ethylene terephthalate)) was used as a substrate. The inks used for-printing the white layer and black-layer were NB-500, manufactured by Dainichiseika Color & Chemicals Mfg. Co., Ltd. The colored layers were set up so as to have a thickness of 400 angstrom for the vapor deposition layer of aluminum and 1 µm for the white layer and black layer, respectively. A transparent acrylic pressure-sensitive adhesive was applied to each side of the substrate and dried to form a pressure-sensitive adhesive layer having a thickness of 20 µm. Thus, a double-faced pressure-sensitive adhesive tape was obtained.

COMPARATIVE EXAMPLE 1

A black layer (chromaticity L: 25) was formed as a colored layer by printing on one side of a 38 µm-thick white substrate film (poly(ethylene terephthalate); chromaticity L: 92). This film was used as a substrate. The ink used for printing the colored layer was NB-500, manufactured by Dainichiseika Color & Chemicals Mfg. Co., Ltd. The colored layer was formed in a thickness of 1 µm. A transparent acrylic pressure-sensitive adhesive was applied to each side of the substrate and dried to form a pressure-sensitive adhesive layer having a thickness of 20 µm. Thus, a double-faced pressure-sensitive adhesive tape was obtained.

COMPARATIVE EXAMPLE 2

A 38 µm-thick white substrate film (poly(ethylene terephthalate); chromaticity L: 92) was used as a substrate. A transparent acrylic pressure-sensitive adhesive was applied to one side of the substrate and dried to form a pressure-sensitive adhesive layer having a thickness of 20 µm. The other side of the substrate was coated with a black acrylic pressure-sensitive adhesive prepared by incorporating a black pigment into that acrylic pressure-sensitive adhesive, and the coating was dried to form a black pressure-sensitive adhesive layer having a thickness of 20 µm (chromaticity L: 25). Thus, a double-faced pressure-sensitive adhesive tape was obtained.

The double-faced pressure-sensitive adhesive tapes obtained in the Examples and Comparative Examples were tested under the following conditions. In the tests, each pressure-sensitive adhesive tape was illuminated from the silver layer side. The results obtained are shown in Table 1.

(Reflectance)

A spectrophotometer manufactured by Shimadzu Corp. was used to measure the mirror reflectance at a wavelength of 550 nm.

TABLE 1

|  | Example 1 | Example 2 | Comparative Example 1 | Comparative Example 2 |
|---|---|---|---|---|
| Mirror reflectance (%) | 94 | 78 | 4 | 4 |

The pressure-sensitive adhesive tapes obtained in the Examples were ascertained to have an improved mirror reflectance as compared with the pressure-sensitive adhesive tapes of the Comparative Examples. The pressure-sensitive adhesive tapes of the Examples hence bring about an elevated luminance when used for fixing a liquid-crystal display module unit to a backlight unit in fabricating an LCD of the internal/external dual lighting type.

While the invention has been described in detail and with reference to specific embodiments thereof, it will be apparent to one skilled in the art that various changes and modifications can be made therein without departing from the spirit and scope thereof.

What is claimed is:

1. A double-sided pressure-sensitive adhesive tape used for fixing a liquid crystal display module unit and a backlight unit, which comprises a substrate and a pressure-sensitive adhesive layer disposed as an outermost layer on both sides of the substrate, wherein the substrate comprises colored layers comprising a silver layer, a layer of a color other than silver or black, and a black layer which are superposed in this order.

2. The double-sided pressure-sensitive adhesive tape as claimed in claim 1, wherein the substrate comprises a supporting substrate and the colored layers, the colored layers being a silver layer, a layer of a color other than silver or black, and a black layer which are superposed in this order from the supporting substrate side.

3. The double-sided pressure-sensitive adhesive tape as claimed in claim 2, wherein the supporting substrate is a transparent substrate film.

4. The double-sided pressure-sensitive adhesive tape as claimed in claim 2, wherein the silver colored layer is made of a metallic vapor deposition layer.

5. The double sided pressure-sensitive adhesive tape as claimed in claim 4, wherein the metallic vapor deposition layer is a vapor deposition layer of silver and/or aluminum.

6. The double-sided pressure-sensitive adhesive tape as claimed in claim 1, wherein the layer of a color other than silver or black is a white layer.

7. The double-sided pressure-sensitive adhesive tape as claimed in claim 2, wherein the layer of a color other than silver or black is a white layer.

8. A liquid-crystal display comprising a liquid-crystal display module unit and a backlight unit, wherein the display module unit and the backlight unit are fixed to each other with the pressure-sensitive adhesive tape as claimed in claim 1.

* * * * *